United States Patent
Childress et al.

(10) Patent No.: US 7,861,884 B2
(45) Date of Patent: Jan. 4, 2011

(54) FUEL TANK ASSEMBLY

(75) Inventors: James J. Childress, Mercer Island, WA (US); Warren A. Davis, II, Renton, WA (US)

(73) Assignee: The Boeing Company, Chicago, IL (US)

(*) Notice: Subject to any disclaimer, the term of this patent is extended or adjusted under 35 U.S.C. 154(b) by 354 days.

(21) Appl. No.: 11/868,712

(22) Filed: Oct. 8, 2007

(65) Prior Publication Data

US 2009/0090724 A1 Apr. 9, 2009

(51) Int. Cl.
*F17C 1/02* (2006.01)
*F17C 13/00* (2006.01)
*B64D 37/04* (2006.01)

(52) U.S. Cl. .............. 220/560.01; 220/4.15; 244/135 R

(58) Field of Classification Search ............... 220/4.14, 220/4.15, 88.3, 560.01, 562, 723, 900; 244/135 B, 244/135 R
See application file for complete search history.

(56) References Cited

U.S. PATENT DOCUMENTS 2,621,719 A * 12/1952 Eaton et al. .................. 137/114
3,949,894 A * 4/1976 Underwood ............ 220/560.02
4,925,057 A 5/1990 Childress et al.
7,357,149 B2 * 4/2008 Howe ......................... 137/399

OTHER PUBLICATIONS

N.A. Moussa, M.D. Whale, D.E. Groszmann, X..J. The Potential For Fuel Tank Fire And Hydrodynamic Ram From Uncontained Aircraft Engine Debris, *DOT/FAA/AR-96-95 Final Report*, National Technical Information Service, Springfield, Virginia, Jan. 1997.

Ginger Bennett, *Review Of Technologies For Active Suppression For Fuel Tank Explosions*, Halon Options Technical Working Conference, pp. 314-324, May 2-4, 2000.

* cited by examiner

*Primary Examiner*—Harry A Grosso
(74) *Attorney, Agent, or Firm*—Alston & Bird LLP

(57) ABSTRACT

A fuel tank assembly are provided which may limit the damage otherwise occasioned by the impact of a ballistic projectile. The fuel tank assembly may include a bladder defined between exterior and interior bladder walls, with the interior bladder wall defining a volume for storing fuel. The exterior bladder wall is at least as or more rigid than the interior bladder wall. The fuel tank assembly can also include connectors between the exterior and interior bladder walls to at least partially limit expansion of the bladder. The fuel tank assembly can also include an inlet opening into the bladder to permit a pressurized gas to be introduced into the bladder. The fuel tank assembly may also include a valve through the interior bladder wall into the volume for storing fuel to permit at least some of the pressurized gas to be introduced therein.

14 Claims, 5 Drawing Sheets

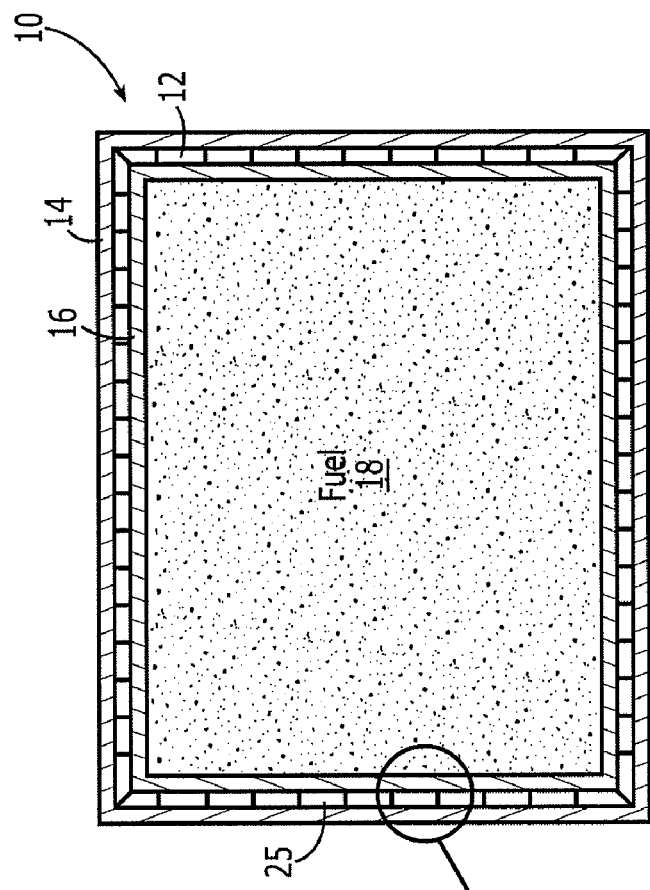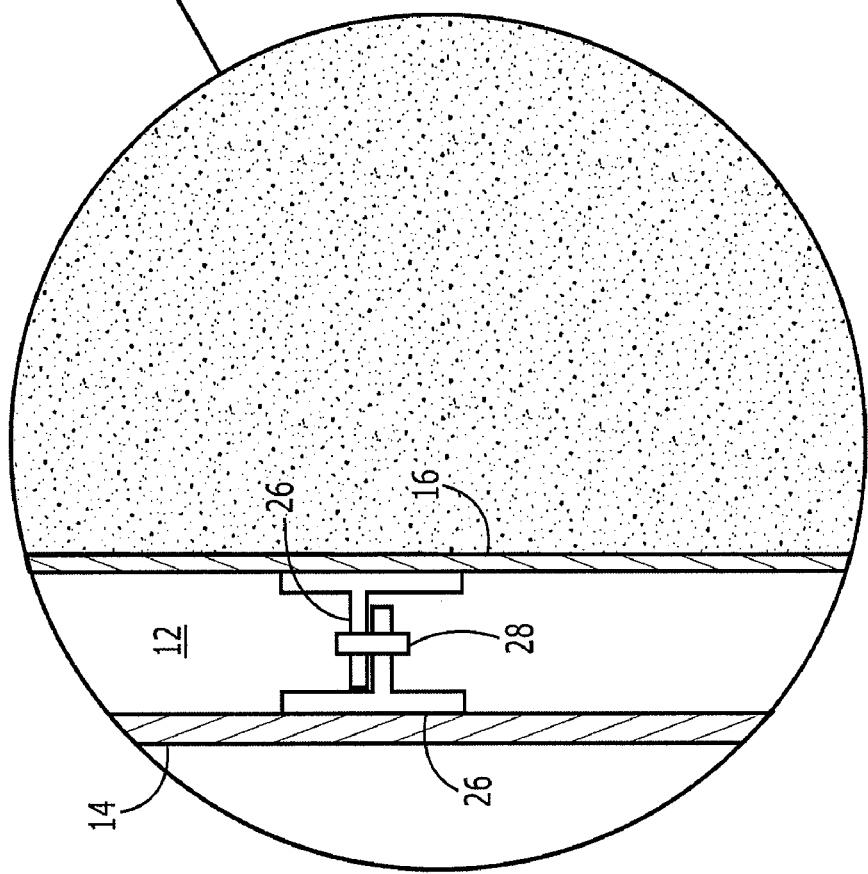
FIG. 3

FUEL TANK ASSEMBLY

FIELD OF THE INVENTION

Embodiments of the present invention relate generally to fuel tanks and, more particularly, to fuel tanks that can withstand at least some impact from ballistic projectiles.

BACKGROUND OF THE INVENTION

Aircraft and other vehicles include fuel tanks for carrying a supply of fuel that may be at least partially consumed during transit. In certain circumstances, a fuel tank carried by an aircraft or other vehicle may be susceptible to being impacted by a ballistic projectile. In a combat or other military situation, for example, a fuel tank of an aircraft or other vehicle may be impacted by gunfire or the like. Alternatively, fragments generated by an uncontained engine failure or the like may also impact the fuel tank of an aircraft or other vehicle and create similar issues.

Regardless of the source of a ballistic projectile, a ballistic projectile can puncture the fuel tank which results not only in damage to the fuel tank, but may also allow fuel to leak from the tank and increase the possibility of a fire or explosion. Moreover, a ballistic projectile that enters a fuel tank may also create a hydrodynamic ram effect which, in turn, can produce even larger holes and tears in a fuel tank and, accordingly, an even greater risk of fire or other damage. In this regard, a ballistic projectile that penetrates a fuel tank has a large amount of kinetic energy. As the projectile passes through the fuel in the tank and is slowed by the fuel, the kinetic energy of the ballistic projectile is transferred to the fuel as a pressure wave. The resulting pressure wave may then strike the wall of the fuel tank over a relatively large area and, depending upon the magnitude of the pressure wave and the construction of the fuel tank, may create a relatively large hole or tear in the wall of the fuel tank.

Various approaches have been taken to protect fuel tanks from ballistic projectiles and/or to minimize the damage created by ballistic projectiles. For example, fuel tanks have been shielded with protective armor to prevent or at least reduce the number of ballistic projectiles that penetrate the fuel tanks. However, the additional weight necessitated by the armor is disadvantageous for vehicular applications including, in particular, aircraft applications in which weight has a direct effect upon the performance of the vehicle and its operational costs. In order to reduce the likelihood of a fire or explosion in the event of the puncture of a fuel tank by a ballistic projectile, fire extinguishing systems have also been employed. These fire extinguishing systems are designed to flood the fuel tank with either an inert gas, such as nitrogen, or a fire extinguishing foam. The use of fire extinguishing systems also disadvantageously increase the weight of the vehicle, and while the fire extinguishing systems may reduce the likelihood of a fire or other explosion, these fire extinguishing systems do not generally prevent the leakage of fuel from punctured fuel tanks.

Additionally, a self-sealing bladder has been disposed within fuel tanks in an effort to limit any fuel spill that would otherwise result from the impact of a ballistic projectile with the fuel tank and, accordingly, to similarly limit the risk of fire or explosion occasioned as a result of fuel leakage. A self-sealing bladder may consist of three layers of rubber with the inner and outer layers being fuel-resistant rubber barriers and the middle layer being thicker and formed of natural rubber. When punctured by a ballistic projectile or otherwise, the middle layer of the bladder will come into contact with the fuel and swell. This swelling of the middle layer of the bladder will seal a hole or tear if the hole or tear is relatively small, thereby limiting the fuel that will spill from the tank in such instances. While self-sealing bladders have been useful, self-sealing bladders add weight to a vehicle which, at least in the instance of an aircraft, may reduce the payload that the aircraft is capable of carrying and/or reduce the range of the aircraft. Additionally, while self-sealing bladders may seal a relatively small hole or tear, at least some fuel generally leaks through the bladder and out from the tank prior to the swelling of the middle layer of the bladder and the sealing of the hole or tear. As such, the fuel that leaks from the tank prior to sealing of the hole or tear still presents at least a potential fire hazard. Further, the hydrodynamic ram protection afforded to the fuel tank by such self-sealing bladders is relatively limited such that larger holes or tears may be created by the hydrodynamic ram effect in some circumstances, even though the fuel tank may be lined with a self-sealing bladder.

Accordingly, while self-sealing bladders and other techniques have at least partially addressed issues associated with the damage to fuel tanks and the threat created by fuel spills from a damaged fuel tank, it would be desirable to provide improved techniques for limiting the damage occasioned by a ballistic projectile impacting a fuel tank, both in terms of the hole or tear created by the ballistic projectile and any resulting fuel spillage from such hole or tear, also in terms of the limitation or prevention of further damage to the fuel tank due to the hydrodynamic ram effect created by a ballistic projectile within the fuel tank.

BRIEF SUMMARY OF THE INVENTION

A fuel tank assembly and associated method are therefore provided according to embodiments of the present invention which may limit the deleterious effect otherwise occasioned by the impact of a ballistic projectile upon a fuel tank. In this regard, the fuel tank assembly and associated method of embodiments of the present invention may limit, if not eliminate, fuel leakage from a fuel tank that may otherwise be produced by the impact of a ballistic projectile with the fuel tank. Additionally, the fuel tank assembly and associated method of embodiments of the present invention may reduce the likelihood of further damage to the fuel tank due to the hydrodynamic ram effect created by the entry of a ballistic projectile within the fuel tank.

In one embodiment, a fuel tank assembly is provided that includes a bladder defined between an exterior bladder wall and an interior bladder wall, with the interior bladder wall defining a volume for storing fuel. The exterior bladder wall of this embodiment is at least more rigid than the interior bladder wall. The interior bladder wall may be comprised of an elastomeric or a composite material. Additionally, the exterior bladder wall may be comprised of a composite or metallic material. In one exemplary embodiment, the interior bladder wall is comprised of rubber and the exterior bladder wall is comprised of a composite material configured to generate fuzz if the exterior bladder wall is punctured. The fuel tank assembly can also include a plurality of connectors between the exterior and interior bladder walls in order to at least partially limit expansion of the bladder.

The fuel tank assembly of this embodiment also includes an inlet opening into the bladder defined between the exterior and the interior bladder walls in order to permit a pressurized gas to be introduced into the bladder. In one embodiment, the fuel tank assembly can also include a valve through the interior bladder wall into the volume for storing fuel to permit at least some of the pressurized gas to be introduced into the volume.

A fuel tank assembly of another embodiment includes a fuel tank and an expandable bladder wall disposed within and connected to the fuel tank to thereby define a bladder bounded by the fuel tank and the bladder wall. The bladder is configured to transition from a deflated configuration in which the bladder wall is proximate the fuel tank to an expanded configuration in which the bladder wall is spaced from the fuel tank. The fuel tank assembly of one embodiment can also include a plurality of connectors between the fuel tank and the expandable bladder wall in order to at least partially limit expansion of the bladder. The fuel tank assembly of this embodiment can also include an inlet opening into the bladder in order to permit a pressurized gas to be introduced within the bladder. Additionally, the fuel tank assembly may include a valve through the bladder wall to permit at least some of the pressurized gas to enter the fuel.

The interior bladder wall may be comprised of an elastomeric or composite material. For example, the interior bladder wall may be comprised of rubber and the fuel tank may be comprised of a composite material configured to generate fuzz if the fuel tank is punctured. In one embodiment, the fuel tank comprises a portion of an aircraft fuselage.

In one embodiment, the fuel tank includes an upper portion that is separable from other portions of the fuel tank to permit the expandable bladder wall to be inserted into the fuel tank. As a result of the intended orientation of the fuel tank, the upper portion of the fuel tank may be formed of a different material than the other portions of the fuel tank.

According to another aspect of the present invention, a method is provided that includes the provision of a fuel tank having an expandable bladder wall disposed within and connected to the fuel tank to thereby define a bladder bounded by the fuel tank and the bladder wall. The method of this aspect of the present invention also includes the introduction of a pressurized gas into the bladder to cause the bladder to transition from a deflated configuration in which the bladder wall is proximate the fuel tank to an expanded configuration in which the bladder wall is spaced from the fuel tank. At least some of the pressurized gas that is introduced into the bladder may also be permitted to vent through the expandable bladder wall. In order to provide a fuel tank having an expandable bladder wall disposed therewithin, an upper portion of the fuel tank may be removed in order to permit the expandable bladder wall to be disposed within the fuel tank and to be connected to the fuel tank. Once the expandable bladder wall has been connected to other portions of the fuel tank, the upper portion of the fuel tank may be replaced.

BRIEF DESCRIPTION OF THE SEVERAL VIEWS OF THE DRAWINGS(S)

Having thus described the invention in general terms, reference will now be made to the accompanying drawings, which are not necessarily drawn to scale, and wherein:

FIG. 3 is a top view of the fuel tank assembly of FIG. 1 with one example of a connector between the fuel tank and the expandable bladder wall being depicted in more detail;

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
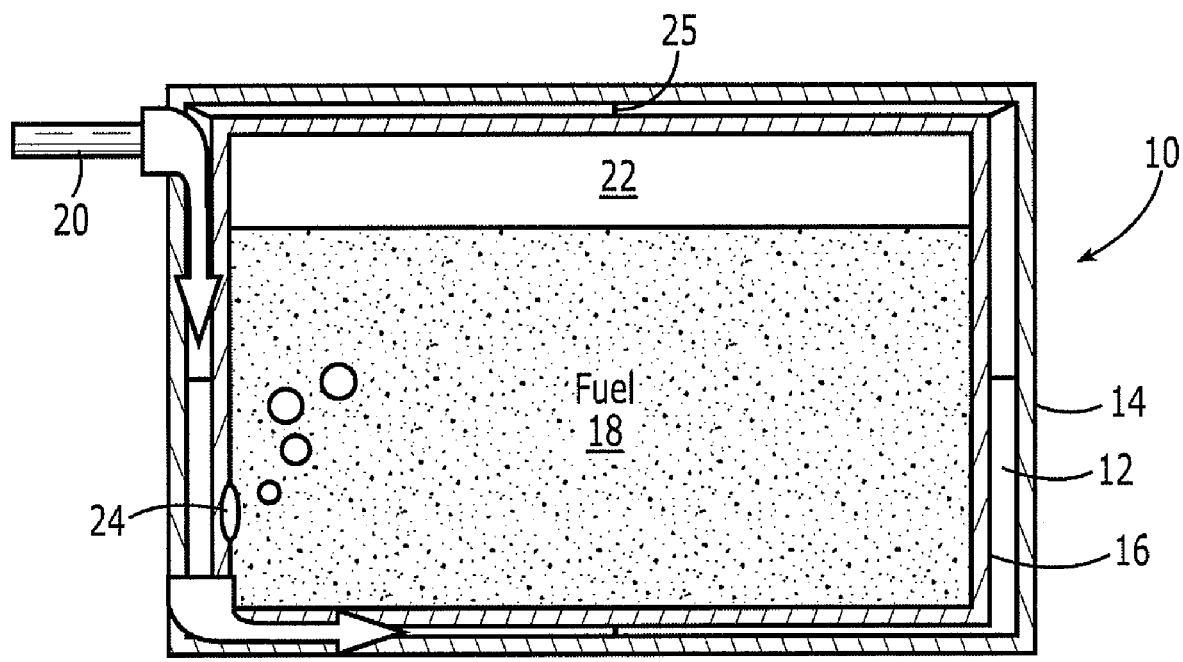
FIG. 1 is a cross-sectional side view of a fuel tank assembly according to one embodiment of the present invention in which the bladder is inflated and ullage is present.
Figure 2:
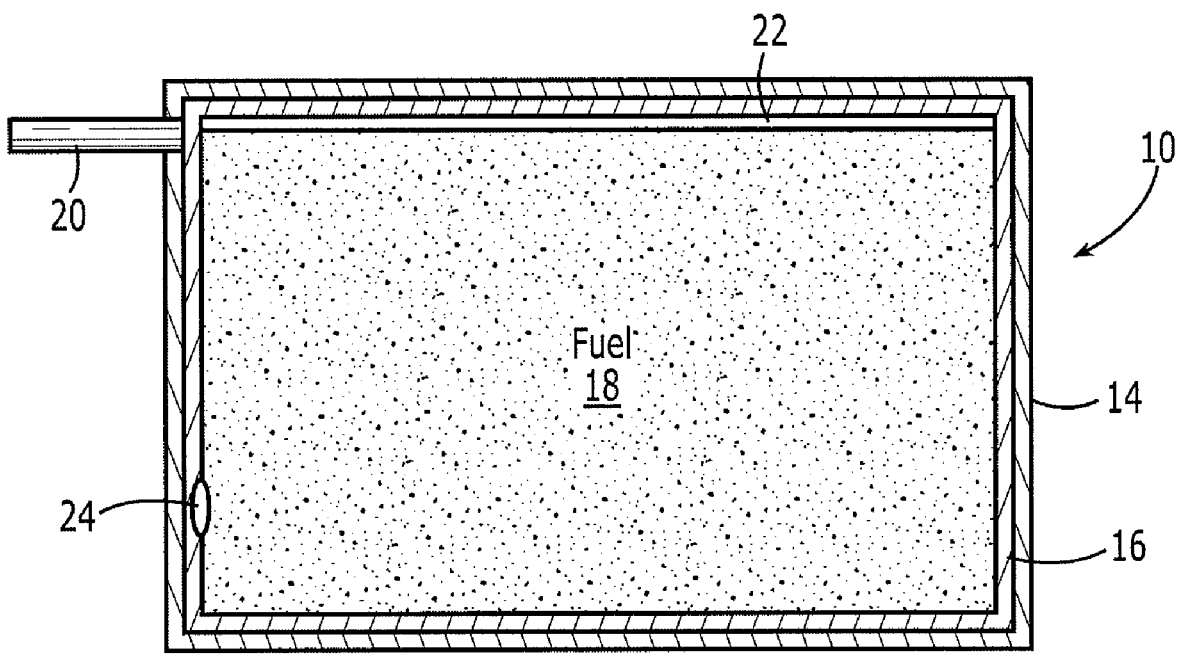
FIG. 2 is a cross-sectional side view of the fuel tank assembly of FIG. 1 in instances in which the fuel tank is completely filled with fuel and the bladder is deflated.

Referring now to FIG. 1, a side view of a fuel tank assembly 10 according to one embodiment to the present invention is depicted. The fuel tank assembly may be employed in a variety of applications and may be carried, for example, by aircraft or other vehicles. As shown, the fuel tank assembly includes an inflatable bladder 12 defined between an exterior bladder wall 14 and an interior bladder wall 16. The interior bladder wall, in turn, defines a volume for storing fuel 18. In instances in which the fuel tank is full or relatively full of fuel, the bladder may be deflated or collapsed as shown by the deflated configuration FIG. 2 such that the capacity of the fuel tank is maximized. For a fuel tank assembly onboard an aircraft or other vehicle, the bladder is generally in a deflated configuration at the beginning of a trip or mission or otherwise following refueling. Thereafter, as fuel is consumed, the bladder may be inflated to an expanded configuration as shown in FIG. 1.

In order to inflate the bladder 12, the fuel tank assembly 10 includes an inlet 20 that opens into the bladder defined between the exterior and interior bladder walls 14, 16. A pressurized gas may be introduced via the inlet into the bladder. The bladder may be filled with various types of gas. In one embodiment, however, the bladder is filled with an inert gas, such as nitrogen. By filling the bladder with an inert gas, the likelihood of an explosion occurring as the result of the impact of a ballistic projectile with the fuel tank is further reduced. In order to inflate the bladder while fuel 18 is disposed within the fuel tank assembly, the gas that is introduced via the inlet is generally pressurized more greatly than the fuel head pressure, that is, the pressure within the ullage 22 between the upper surface of the fuel and the upper portion of the fuel tank assembly. In one embodiment, for example, the gas that is introduced via the inlet is pressurized to about 2 PSI greater than the fuel head pressure.

The pressurized gas is generally supplied continuously into the bladder 12 via the inlet 20. The fuel tank assembly 10 can include a valve 24, such as a bleed valve, opening from the bladder through the interior bladder wall 16 into the volume that is at least partially filled with fuel 18. The valve serves as a pressure release valve to bleed excess gas from the bladder into the tank. The excess gas generally migrates upwardly through the fuel into the ullage 22 above the upper surface of the fuel.

As shown in FIG. 1 as well as the top view of the fuel tank assembly 10 depicted in FIG. 3, the fuel tank assembly generally includes a plurality of connectors 25 that interconnect the exterior and interior bladder walls 14, 16 and provide for the relative movement between the exterior and interior bladder walls, such as movement of the interior bladder wall relative to the exterior bladder wall, while also at least partially limiting expansion of the bladder. The connectors can be embodied in a number of different manners. In the embodiment depicted in FIG. 3, the connector includes flanges 26 attached to the exterior and interior bladder walls, such as by bonding, co-curing, sonic welding, thermal welding or the like. The connector also includes a fastener 28, such as either a non-blind fastener or a blind fastener, lacing or a combination of both a fastener and lacing interconnecting the respective flanges. The flanges may be formed of various materials and, as such, may be rigid structural members, flexible elastomeric or rubber members, composite or metallic ribs and longerons or the like. The size of the bladder, once inflated, may be at least partially defined by the connectors and, in one embodiment, the connectors permit the bladder to be expanded to have a thickness between the interior and exterior bladder walls of between about one half inch and one inch.

The exterior bladder wall 14 may be more rigid than the interior bladder wall 16. For example, the exterior bladder wall may be formed of a composite material or a metallic material, while the interior bladder wall may be formed of an elastomeric or composite material. As such, the exterior bladder wall may be a rigid or semi-rigid wall having appropriate wound-closing characteristics as described below, while also being configured to carry the structural load imposed upon the fuel tank assembly 10. Conversely, the interior bladder wall may be formed of a fuel resistant elastomeric material, such as a rubber material, or may be formed as a semi-rigid wall having the appropriate wound-closing characteristic as also described below. In one example, the interior bladder wall is formed of a rubber material and the exterior bladder wall is formed of a composite material, such as Kevlar, S-glass, etc.

Figure 4:
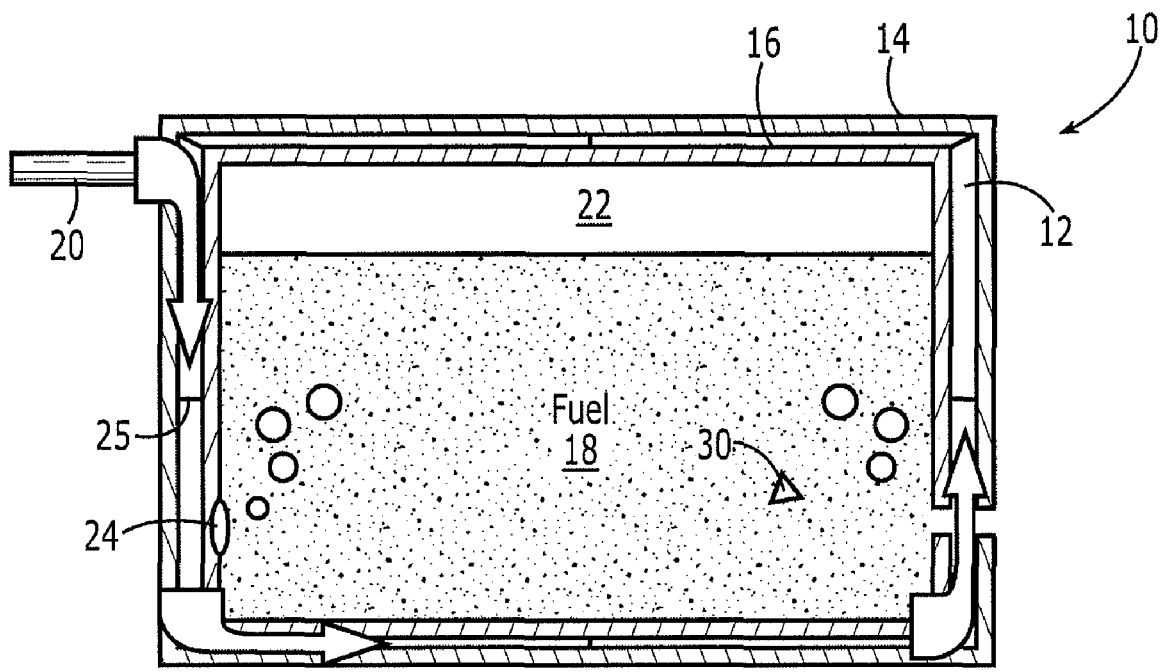
FIG. 4 is a cross-sectional view of the fuel tank assembly of FIG. 1 in which a ballistic projectile has penetrated the fuel tank assembly.
Figure 5:
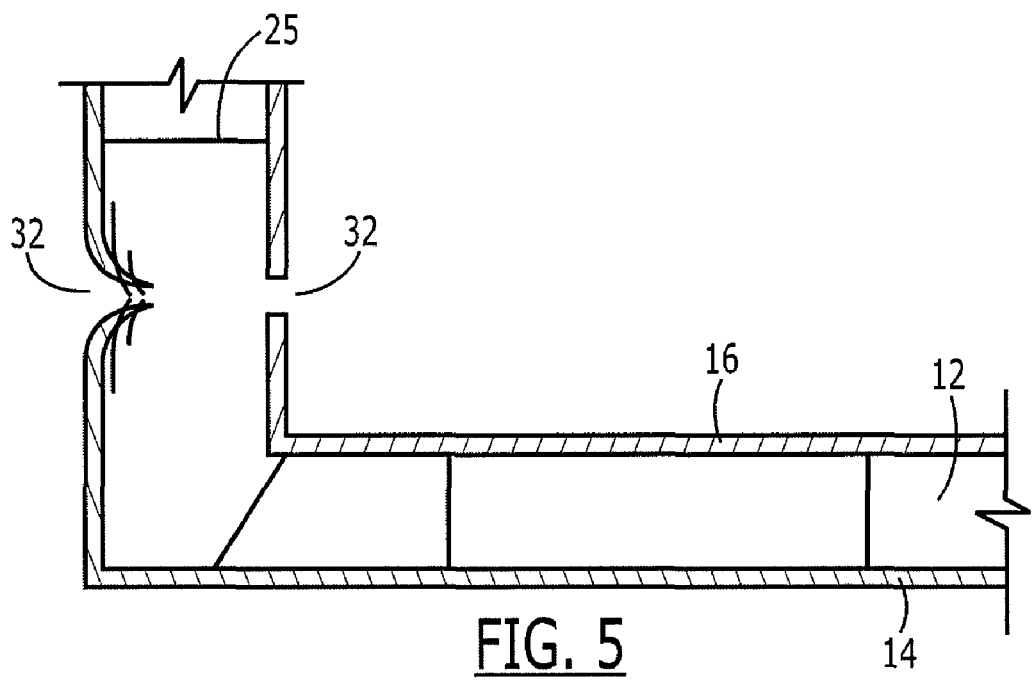
FIG. 5 is a fragmentary cross-sectional view of that portion of the fuel tank assembly through which the ballistic projectile entered the fuel tank assembly of FIG. 4 which depicts the fuel tank and the expandable bladder wall.

In instances in which the fuel tank assembly 10 is punctured by a ballistic projectile 30, such as gunfire or a fragment from either an exploding warhead or an uncontained engine failure, a hole or tear 32 may be produced in both the exterior and interior bladder walls 14, 16. As a result of the pressurization of the bladder 12, the pressurized gas will flow through the hole in the interior bladder wall and into the fuel 18, thereby limiting the fuel which otherwise would escape through the hole. See, for example, FIG. 4. Additionally, the exterior and interior bladder walls are advantageously constructed so as to reduce or minimize the size of the hole and to at least partially constrict following penetration of the ballistic projectile. As shown in FIG. 5, the interior bladder wall, such as a interior bladder wall formed of an elastomeric or composite material, will return to its original position following penetration by the ballistic projectile as a result of the plurality of connectors between the exterior and interior bladder walls and are general resiliency of the interior bladder wall. By returning to its original position, the size of the hole formed in the interior bladder wall by the ballistic projectile is reduced. Additionally, an exterior bladder wall formed of a composite material is configured to generate fuzz which assists in at least partially sealing the hole formed in the exterior bladder wall. For example, an exterior bladder wall formed of a Kevlar material will generate Kevlar fuzz as a result of the puncture by a ballistic projectile. In embodiments in which the interior bladder wall is formed of a composite material, the composite material of the interior bladder wall will also generally generate fuzz in response to the puncture of the interior bladder wall by the ballistic projectile in order to at least partially seal the hole in the interior bladder wall.

The bladder 12 also serves to reduce the possibility that a larger hole or tear will be created by the hydrodynamic ram effect generated by the ballistic projectile 30 entering the fuel tank. In this regard, the flexibility of the interior bladder wall 16 combined with the rigidity of the exterior bladder wall 14 reduce the likelihood that a larger hole or tear will be created as a result of the hydrodynamic ram effect.

Figure 6:
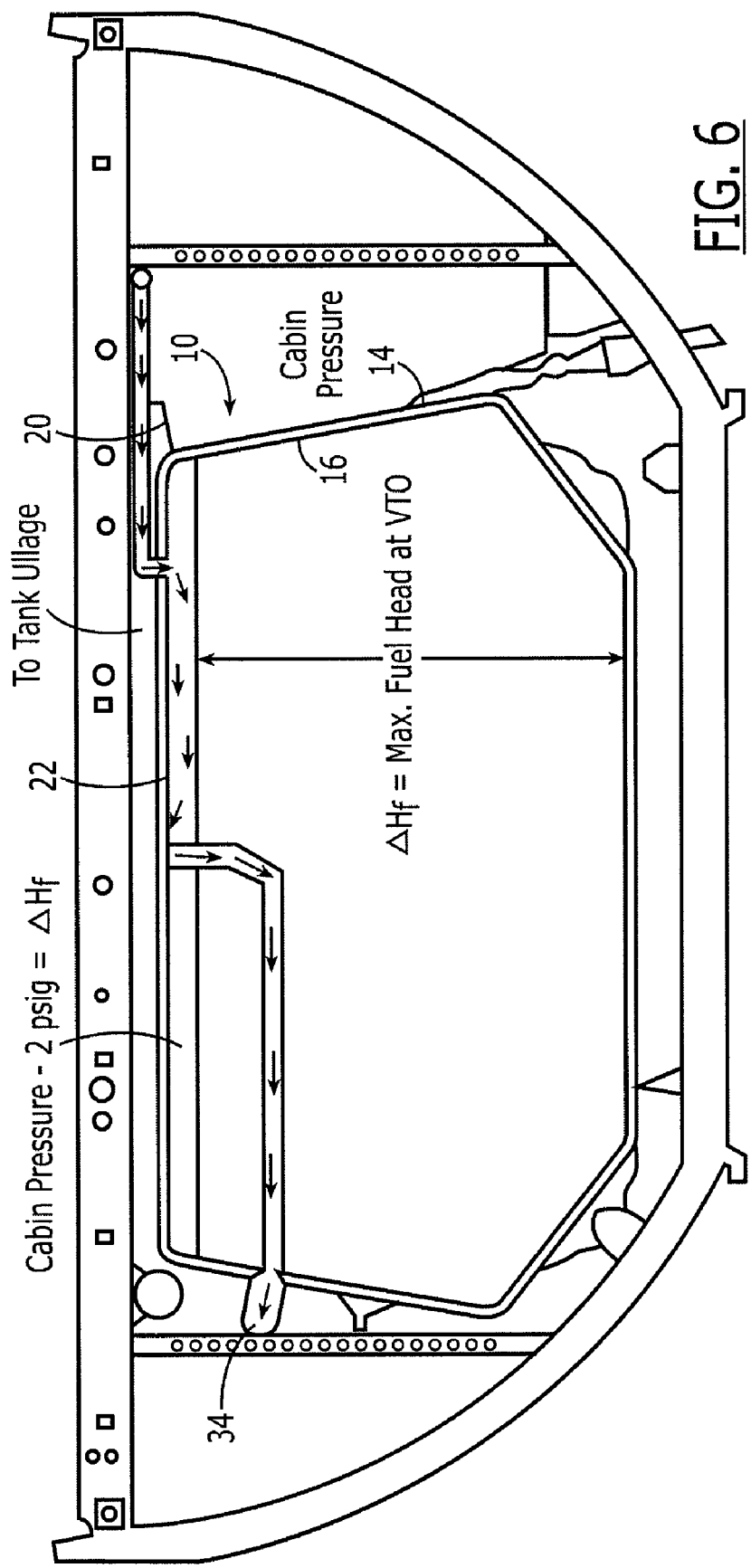
FIG. 6 is a cross-sectional side view of a fuel tank assembly in which the fuel tank is formed by a portion of the fuselage of an aircraft.

As noted above, the bladder 12 is generally defined between a more rigid exterior bladder wall 14 and a more flexible interior bladder wall 16. In one embodiment, the bladder is defined between the fuel tank itself and an expandable bladder wall disposed within and connected to the fuel tank. As such, the fuel tank of this embodiment serves as the exterior bladder wall, while the expandable bladder wall serves as the interior bladder wall. Moreover, the fuel tank of this embodiment may be defined by a portion of an aircraft fuselage as shown in FIG. 6. As shown in FIG. 6, a bladder is defined between a portion of the aircraft fuselage and an expandable bladder wall disposed within and connected to the fuselage. An inlet 20 opens into the bladder for providing pressurized gas to the bladder. As shown, the pressurized gas is also provided to the tank ullage 22. Additionally, a vent line 34 is provided from the tank ullage to ambient. Although not shown, the fuel tank assembly 10 of FIGS. 1-4 can also include a similar vent line and inlet to the tank ullage as shown in conjunction with the embodiment of FIG. 6. Although not shown in any of the embodiments, fuel lines for filling and drawing fuel from the fuel tank and/or various sensors and/or plumbing for monitoring refuel tank assembly 10 may also be provided in the various embodiments. Although the fuselage may be formed of various materials, that positioned the fuselage that forms the fuel tank assembly of one embodiment may be formed of a Kevlar or S-2 fiberglass laminate material having a thickness of about 0.1 inches to 0.5 inches with the Kevlar or S-2 fiberglass laminate material inherently sealing if punctured by a ballistic projectile in order to limit or prevent the escape of fuel therefrom.

In the embodiment depicted in FIG. 6, the ullage above the fuel is generally maintained at cabin pressure minus 2 PSIG minus $\Delta H_f$ wherein $\Delta H_f$ is the maximum fuel head at volumetric top-off (VTO), i.e., at the maximum fuel volume, and the inflatable bladder is pressurized at 2 PSI greater than the fuel head pressure.

Figure 7:
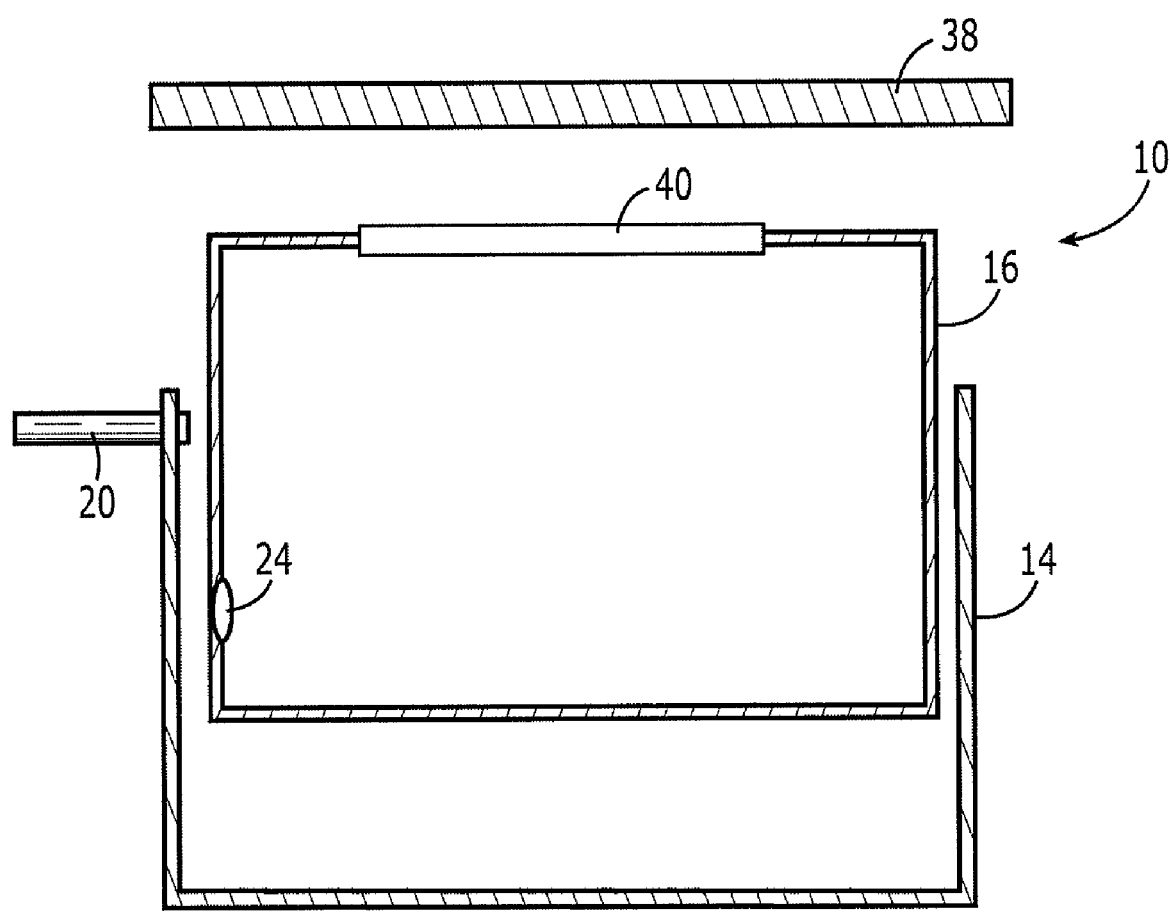
FIG. 7 is an exploded cross-sectional side view illustrating the separation of an upper portion of the fuel tank from other portions of the fuel tank in order to insert or remove the expandable bladder wall therefrom.

The fuel tank assembly 10 can be fabricated in the various manners. In one embodiment depicted in FIG. 7 in which a fuel tank forms the exterior bladder wall 14, the top or upper portion 38 of the fuel tank may be removable or separable from other portions of the fuel tank. In this instance, the upper portion of the fuel tank may be removed and an expandable bladder wall 16 may be disposed within the fuel tank and connected to the fuel tank by means of a plurality of connectors 25 as described above. If desired, the expandable bladder wall may include an access panel 40 in an upper portion thereof. Thereafter, the upper portion fuel tank may be replaced and connected to the other portions of the fuel tank. In this embodiment, the upper portion of the fuel tank may be formed of a different material than the remainder of the fuel tank since the upper portion of the fuel tank does not necessarily need to be self-sealing in the same fashion as other portions of the fuel tank since the anticipated orientation of the fuel tank assembly will be such that fuel will be unlikely to escape or leak through a hole or tear in the upper portion of the fuel tank. For example, the upper portion of the fuel tank may be formed of metal, graphite or another non-sealing material, while the remainder of the fuel tank is formed of Kevlar material.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fuel tank assembly comprising:
   a bladder defined between an exterior bladder wall and an interior bladder wall, wherein the interior bladder wall defines a volume for storing fuel, and wherein the exterior bladder wall is comprised of a different material than the interior bladder wall so as to be at least more rigid than the interior bladder wall;
   an inlet opening into the bladder defined between the exterior and interior bladder walls in order to permit a pressurized gas to be introduced within the bladder such that the exterior and interior bladder walls are in contact with the pressurized gas; and
   a plurality of connectors extending between the exterior and interior bladder walls in order to at least partially limit expansion of the bladder while permitting the pressurized gas to flow past the connectors in order to be housed within the bladder on opposite sides of the connectors.

2. A fuel tank assembly according to claim 1 wherein the interior bladder wall is comprised of an elastomeric or a composite material.

3. A fuel tank assembly according to claim 1 wherein the exterior bladder wall is comprised of a composite or metallic material.

4. A fuel tank assembly according to claim 1 wherein the interior bladder wall is comprised of rubber and the exterior bladder wall is comprised of a composite material configured to generate fuzz if the exterior bladder wall is punctured.

5. A fuel tank assembly according to claim 1 further comprising a valve through the interior bladder wall into the volume for storing fuel to permit at least some pressurized gas to enter the volume.

6. A fuel tank assembly according to claim 1 wherein the bladder extends continuously about a majority of a fuel tank.

7. A fuel tank assembly comprising:
   a rigid fuel tank;
   an expandable bladder wall disposed within and connected to the fuel tank to thereby define a bladder bounded by the fuel tank and the bladder wall, the bladder wall formed of a different material than the fuel tank and configured to transition from a deflated configuration in which the bladder wall is proximate the fuel tank to an expanded configuration in which the bladder wall is spaced from the fuel tank;
   an inlet opening into the bladder in order to permit a pressurized gas to be introduced within the bladder such that the fuel tank and the bladder wall are in contact with the pressurized gas; and
   a plurality of connectors extending between the fuel tank and the bladder wall in order to at least partially limit expansion of the bladder wall while permitting the pressurized gas to flow past the connectors in order to be housed within the bladder on opposite sides of the connectors.

8. A fuel tank assembly according to claim 7 wherein the interior bladder wall is comprised of an elastomeric or a composite material.

9. A fuel tank assembly according to claim 8 wherein the interior bladder wall is comprised of rubber and the fuel tank is comprised of a composite material configured to generate fuzz if the fuel tank is punctured.

10. A fuel tank assembly according to claim 7 wherein the fuel tank comprises a portion of an aircraft fuselage.

11. A fuel tank assembly according to claim 7 wherein the fuel tank comprises an upper portion that is separable from other portions of the fuel tank to permit the expandable bladder wall to be inserted into the fuel tank.

12. A fuel tank assembly according to claim 11 wherein the upper portion is comprised of a different material than the other portions of the fuel tank.

13. A fuel tank assembly according to claim 7 further comprising a valve through the bladder wall to permit at least some pressurized gas to enter the fuel.

14. A fuel tank assembly according to claim 7 wherein the bladder extends continuously about a majority of the fuel tank.

* * * * *